US009045325B2

(12) United States Patent
Apps et al.

(10) Patent No.: US 9,045,325 B2
(45) Date of Patent: Jun. 2, 2015

(54) PLASTIC BEER KEG

(75) Inventors: William P. Apps, Alpharetta, GA (US); Wayne Matthew Hansen, Poynette, WI (US)

(73) Assignee: Rehrig Pacific Company, Los Angeles, CA (US)

( * ) Notice: Subject to any disclaimer, the term of this patent is extended or adjusted under 35 U.S.C. 154(b) by 73 days.

(21) Appl. No.: 13/292,141

(22) Filed: Nov. 9, 2011

(65) Prior Publication Data

US 2012/0181289 A1     Jul. 19, 2012

Related U.S. Application Data

(60) Provisional application No. 61/411,787, filed on Nov. 9, 2010.

(51) Int. Cl.
| | |
|---|---|
| B65D 25/14 | (2006.01) |
| B65D 81/38 | (2006.01) |
| B65D 21/02 | (2006.01) |

(Continued)

(52) U.S. Cl.
CPC .............. *B67D 1/0829* (2013.01); *B65D 51/16* (2013.01); *B65D 1/20* (2013.01); *B65D 39/086* (2013.01); *B65D 11/08* (2013.01); *B67D 1/0832* (2013.01); *B67D 1/125* (2013.01)

(58) Field of Classification Search
USPC ............. 220/495.01, 495.03, 495.06, 495.08, 220/495.1, 592.19, 23.89, 320, 288, 4.08, 220/4.05, 4.04, 328, 327, 319, 315, 203.06, 220/DIG. 1, 259.3, 256.1, 259.4, 254.8; 215/11.3; 222/400.7, 400.8, 399, 394, 222/395, 105, 389, 390
See application file for complete search history.

(56) References Cited

U.S. PATENT DOCUMENTS

| 3,825,145 A | 7/1974 | Reynolds |
| 3,827,595 A | 8/1974 | Reynolds |

(Continued)

FOREIGN PATENT DOCUMENTS

| DE | 199 58 958 | 6/2000 |
| EP | 1095897 | 5/2001 |

(Continued)

OTHER PUBLICATIONS

Partial European Search Report for EP Application No. 11188502.6, Mar. 2, 2012, (Feb. 24, 2012).

(Continued)

*Primary Examiner* — Jeffrey Allen
*Assistant Examiner* — Jennifer Castriotta
(74) *Attorney, Agent, or Firm* — Carlson, Gaskey & Olds

(57) ABSTRACT

A plastic keg includes a liner including a neck portion and a body portion. A lid having an opening is disposed at least partially over the liner. A retainer is secured to the neck portion of the liner and aligned with the opening in the lid, the retainer including external threads. A locking ring having internal threads is secured to the external threads of the retainer. The internal threads of the locking ring and the external threads of the retainer include a ratcheting mechanism permitting attachment of the locking ring to the retainer and inhibiting removal of the locking ring from the retainer. A beer keg valve assembly includes a port having a head portion having a convex upper surface and at least one leg extending downwardly from a lower surface. The leg includes a stop surface projecting radially outward further than the head portion.

14 Claims, 12 Drawing Sheets

(51) Int. Cl.
  *B65D 45/00* (2006.01)
  *B65D 51/16* (2006.01)
  *B65D 43/14* (2006.01)
  *B67D 1/08* (2006.01)
  *B65D 1/20* (2006.01)
  *B65D 39/08* (2006.01)
  *B65D 8/02* (2006.01)
  *B67D 1/12* (2006.01)

(56) References Cited

U.S. PATENT DOCUMENTS

| | | | |
|---|---|---|---|
| 3,908,871 A | | 9/1975 | Gottwald |
| 3,952,904 A | | 4/1976 | Verlinden |
| 4,007,848 A | * | 2/1977 | Snyder ............................ 215/44 |
| 4,007,850 A | * | 2/1977 | Beaugrand .................... 215/216 |
| 4,032,047 A | | 6/1977 | Wilson |
| 4,482,067 A | | 11/1984 | Saito et al. |
| 4,491,247 A | | 1/1985 | Nitchman |
| 4,519,219 A | | 5/1985 | Prepodnik et al. |
| 4,531,656 A | | 7/1985 | Nitchman |
| 4,799,597 A | * | 1/1989 | Mayes et al. ................... 215/250 |
| 4,867,348 A | | 9/1989 | Dorfman |
| 5,129,534 A | | 7/1992 | Dunn |
| 5,222,620 A | * | 6/1993 | Lima et al. ............... 220/495.08 |
| 5,267,669 A | | 12/1993 | Dixon et al. |
| 5,345,666 A | * | 9/1994 | Matyja ............................ 29/451 |
| 5,375,741 A | * | 12/1994 | Harris ............................ 222/105 |
| 5,595,208 A | | 1/1997 | Augustinus et al. |
| 5,597,085 A | | 1/1997 | Rauworth et al. |
| 5,897,016 A | | 4/1999 | Wheaton |
| 6,196,277 B1 | | 3/2001 | Till |
| 6,260,823 B1 | | 7/2001 | Weber |
| 6,308,858 B1 | | 10/2001 | Koefelda |
| 6,343,916 B1 | | 2/2002 | Bougamont et al. |
| 6,415,959 B1 | | 7/2002 | Bougamont et al. |
| 6,626,314 B1 | | 9/2003 | McHenry et al. |
| 6,748,789 B2 | | 6/2004 | Turner et al. |
| 6,751,981 B1 | | 6/2004 | Burnette |
| 6,805,267 B2 | | 10/2004 | Bougamont et al. |
| 7,134,578 B2 | | 11/2006 | Bougamont et al. |
| 7,174,762 B2 | | 2/2007 | Turner et al. |
| 7,455,082 B2 | | 11/2008 | Monzel |
| 7,546,935 B2 | | 6/2009 | Wheaton |
| 7,669,725 B2 | * | 3/2010 | Randolph et al. ............ 215/12.1 |
| 2004/0026461 A1 | | 2/2004 | Bougamont et al. |
| 2006/0049213 A1 | | 3/2006 | Wheaton |
| 2008/0251542 A1 | | 10/2008 | Rossignol |
| 2008/0277001 A1 | | 11/2008 | Wheaton |
| 2009/0206505 A1 | | 8/2009 | Monzel et al. |
| 2009/0320264 A1 | | 12/2009 | Berger et al. |
| 2010/0018994 A1 | * | 1/2010 | Antheil et al. ................ 222/105 |
| 2010/0077790 A1 | | 4/2010 | Apps |
| 2010/0264140 A1 | | 10/2010 | Apps |
| 2011/0017737 A1 | | 1/2011 | Apps |
| 2011/0180535 A1 | | 7/2011 | Apps |

FOREIGN PATENT DOCUMENTS

| | | |
|---|---|---|
| EP | 1270499 | 1/2003 |
| EP | 1947029 | 7/2008 |
| EP | 2281753 | 2/2011 |
| GB | 437295 | 10/1935 |
| GB | 1 549 733 | 8/1979 |
| GB | 2182319 | 5/1987 |
| GB | 2188040 | 9/1987 |
| GB | 2209740 | 5/1989 |
| GB | 2 246 768 A | 2/1992 |
| GB | 2283967 | 5/1995 |
| WO | 9112196 | 8/1991 |
| WO | 99 39990 A1 | 8/1999 |
| WO | 03 093163 | 11/2003 |
| WO | 2004063087 | 7/2004 |
| WO | 2006 021753 | 3/2006 |
| WO | 2006 110948 A1 | 10/2006 |
| WO | 2006110948 | 10/2006 |
| WO | 2008013819 | 1/2008 |
| WO | 2008083782 | 7/2008 |
| WO | 2011 093970 A2 | 8/2011 |

OTHER PUBLICATIONS

European Search Report for EP Application No. 11188502.6, May 8, 2012.
Appeal Brief filed with the USPTO on Jul. 15, 2013 for U.S. Appl. No. 12/243,742.
Examiners Answer mailed on Oct. 28, 2013 for U.S. Appl. No. 12/243,742.
Reply Brief filed with the USPTO on Dec. 27, 2013 for U.S. Appl. No. 12/243,742.
Appeal Brief filed with the USPTO on Jun. 19, 2013 for U.S. Appl. No. 12/693,831.
Examiners Answer mailed on Oct. 24, 2013 for U.S. Appl. No. 12/693,831.
Reply Brief filed with the USPTO on Dec. 24, 2013 for U.S. Appl. No. 12/693,831.
Final Office Action mailed on Feb. 28, 2014 for U.S. Appl. No. 12/509,819.
Non-Final Office Action mailed Apr. 21, 2014 for U.S. Appl. No. 13/292,142.

\* cited by examiner

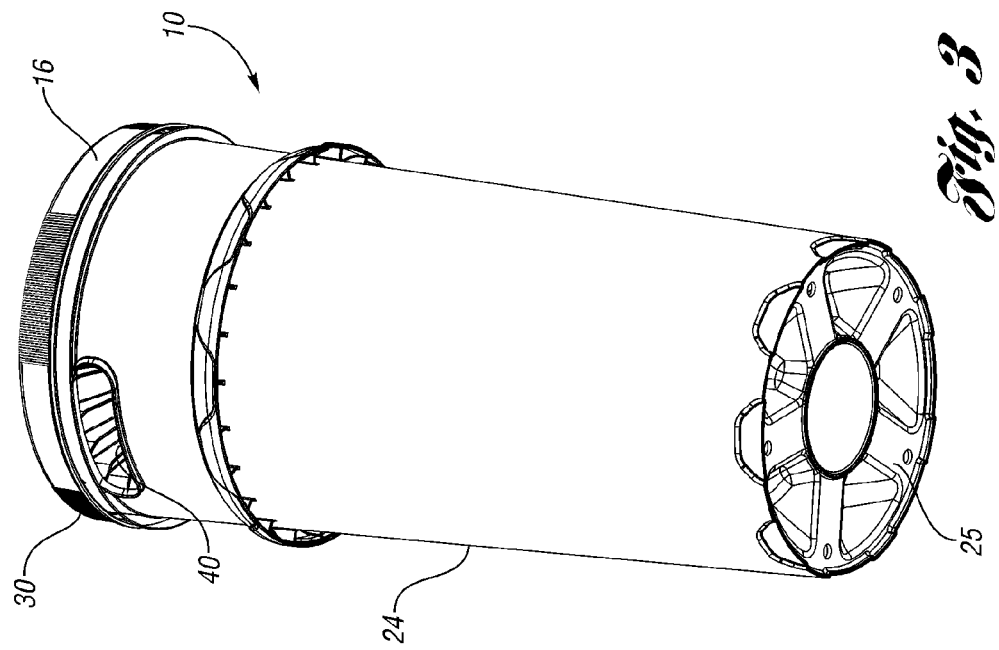
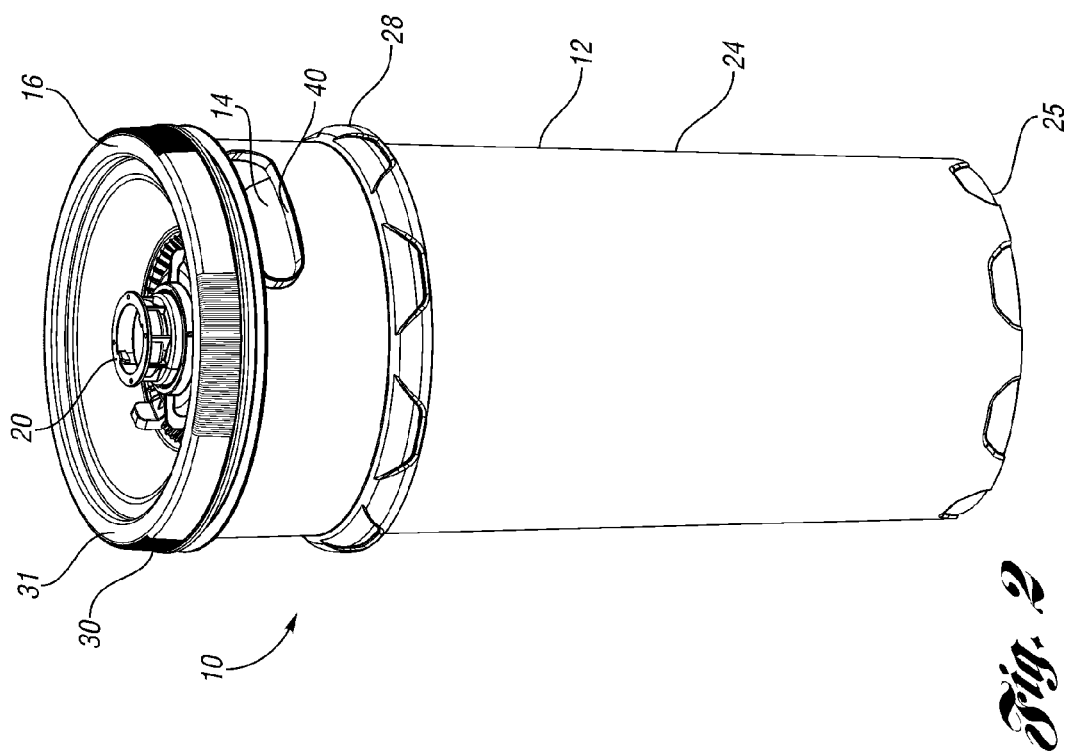

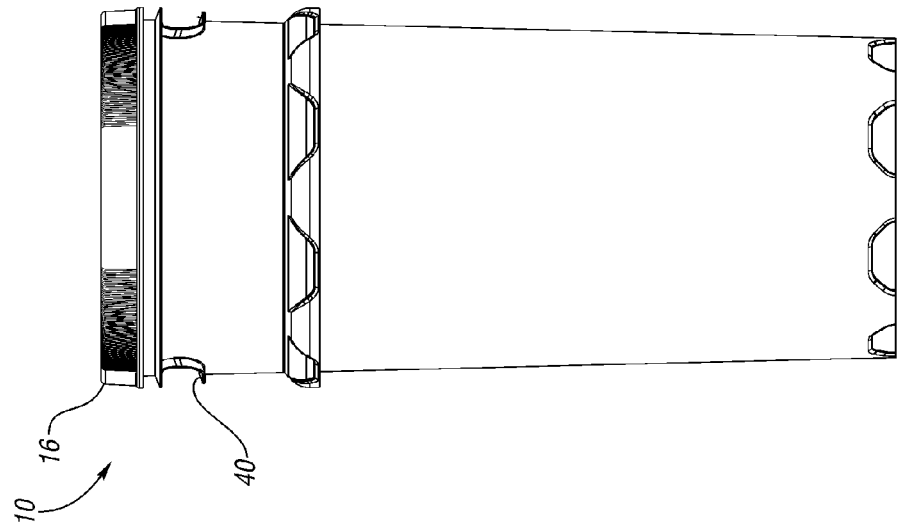
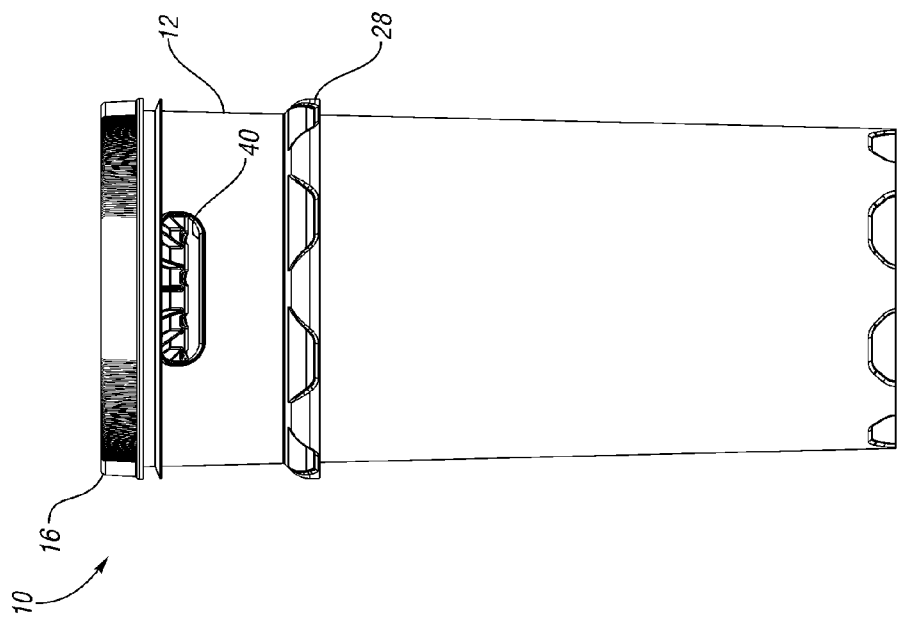

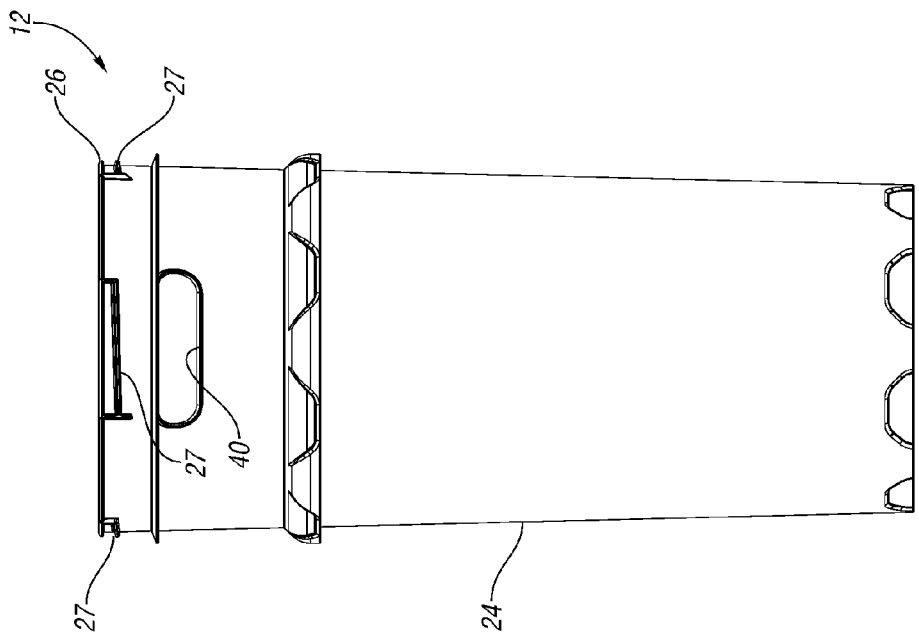
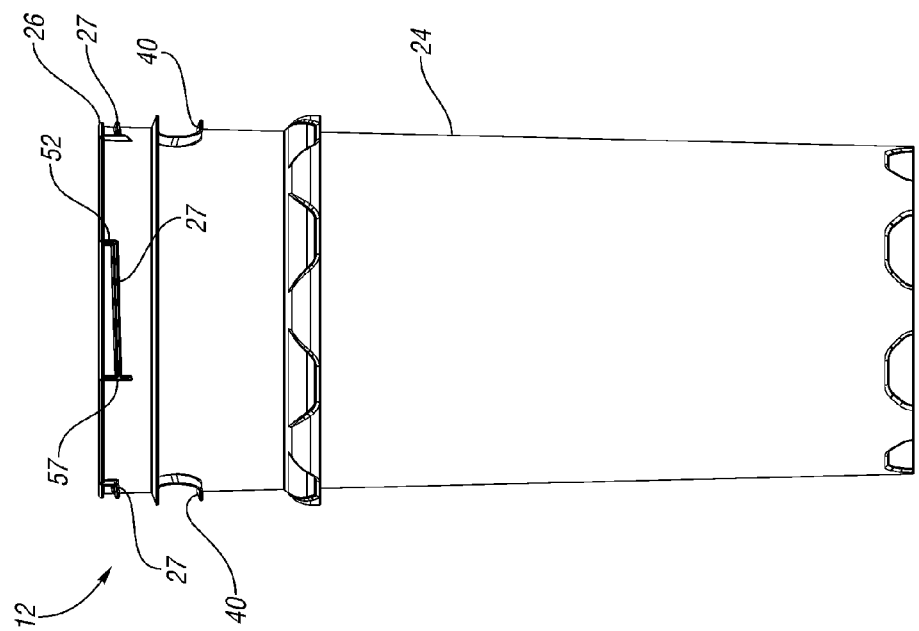

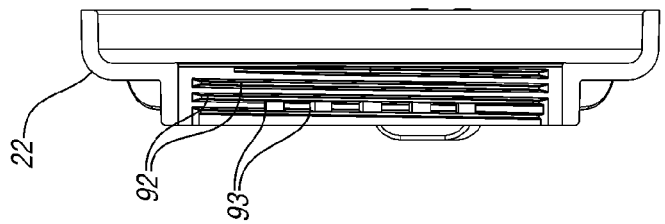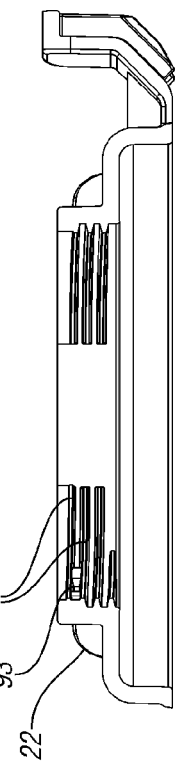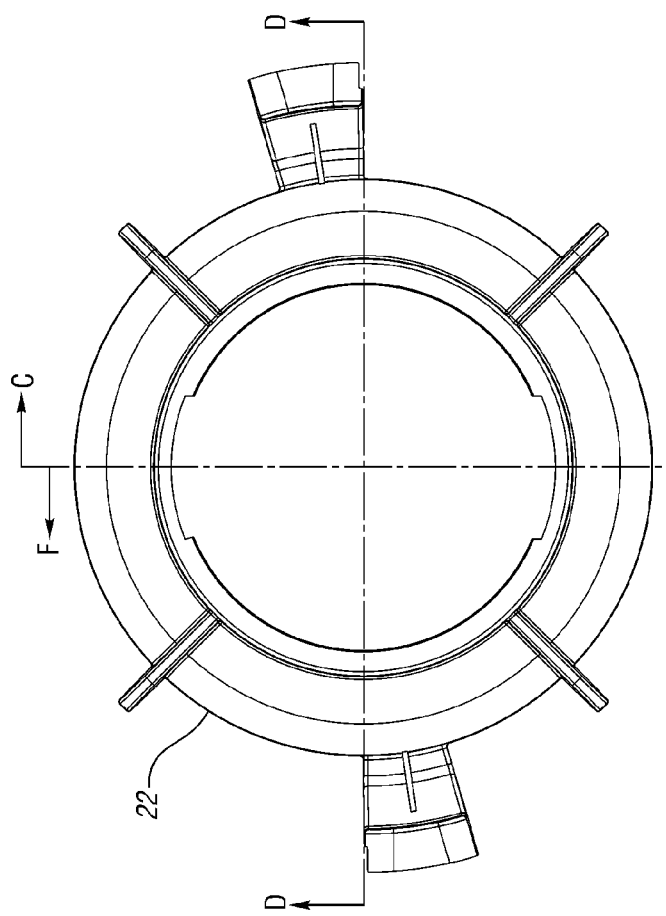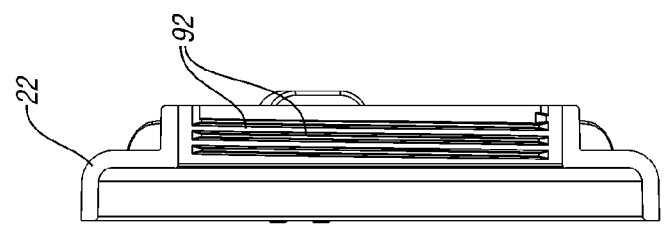

PLASTIC BEER KEG

This application claims priority to U.S. Provisional Application Ser. No. 61/411,787, filed Nov. 9, 2010.

BACKGROUND

The present invention relates to a plastic container for liquids, particularly beverages such as beer.

Most current beer kegs include a steel body with a valve in the top for both filling the keg and for accessing the contents. The steel kegs are reusable. Empty kegs are returned and then washed and refilled in an automated process. The steel kegs are inverted, such that the valve is at the bottom of the keg to facilitate draining during cleaning. The interior of the body of the keg is washed by spraying cleansing liquids through the valve. The cleansing liquids wash the inner surface of the body of the keg and then drain downward through the valve. The kegs are typically then filled in the inverted position through the valve at the bottom of the keg. Throughout the automated process, a cylinder clamps the body of the keg with a high force (between 200 and 300 lb.) to hold the keg in place while the washing and filling heads connect to the valve at the bottom of the keg.

There are several problems with the use of steel kegs. First, they are fairly heavy, even when empty. Second, they are expensive and are not always returned by the user. If a deposit is charged to the user to ensure the return of the keg, this may discourage the user from choosing to purchase beer by the keg in the first place. However, if the deposit is too low, it is possible that the value of the steel in the keg exceeds the amount of the deposit, thus contributing to some kegs not being returned.

SUMMARY

According to one feature of the present invention, a plastic keg includes a liner including a neck portion and a body portion. A lid having an opening is disposed at least partially over the liner. A retainer is secured to the neck portion of the liner and aligned with the opening in the lid, the retainer including external threads. A locking ring having internal threads is secured to the external threads of the retainer. The internal threads of the locking ring and the external threads of the retainer include a ratcheting mechanism permitting attachment of the locking ring to the retainer and inhibiting removal of the locking ring from the retainer, the locking ring contacting the lid.

According to another feature of the present invention, which can be practiced with or without the first feature, a beer keg valve assembly includes a port having a head portion having a convex upper surface and at least one leg extending downwardly from a lower surface. The leg includes a stop surface projecting radially outward further than the head portion. A piston defines an opening. A spring biases the port against a periphery of the opening defined by the piston to seal the convex upper surface of the head portion over the opening.

These and other features of the application can be best understood from the following specification and drawings, the following of which is a brief description.

BRIEF DESCRIPTION OF THE DRAWINGS

FIG. 2 is a perspective view of the plastic keg.
FIG. 3 is a bottom perspective view of the plastic keg.
FIG. 4 is a first side view of the plastic keg.
FIG. 5 is a second side view of the plastic keg.
FIG. 6 is a first side view of the outer container.
FIG. 7 is a second side view of the outer container.
FIG. 11 is a top view of the locking ring.
FIG. 12 is a section view taken along line C-C of FIG. 11.
FIG. 13 is a section view taken along line D-D of FIG. 11.
FIG. 14 is a section view taken along line F-F of FIG. 11.

DETAILED DESCRIPTION OF THE PREFERRED EMBODIMENTS

Figure 1:
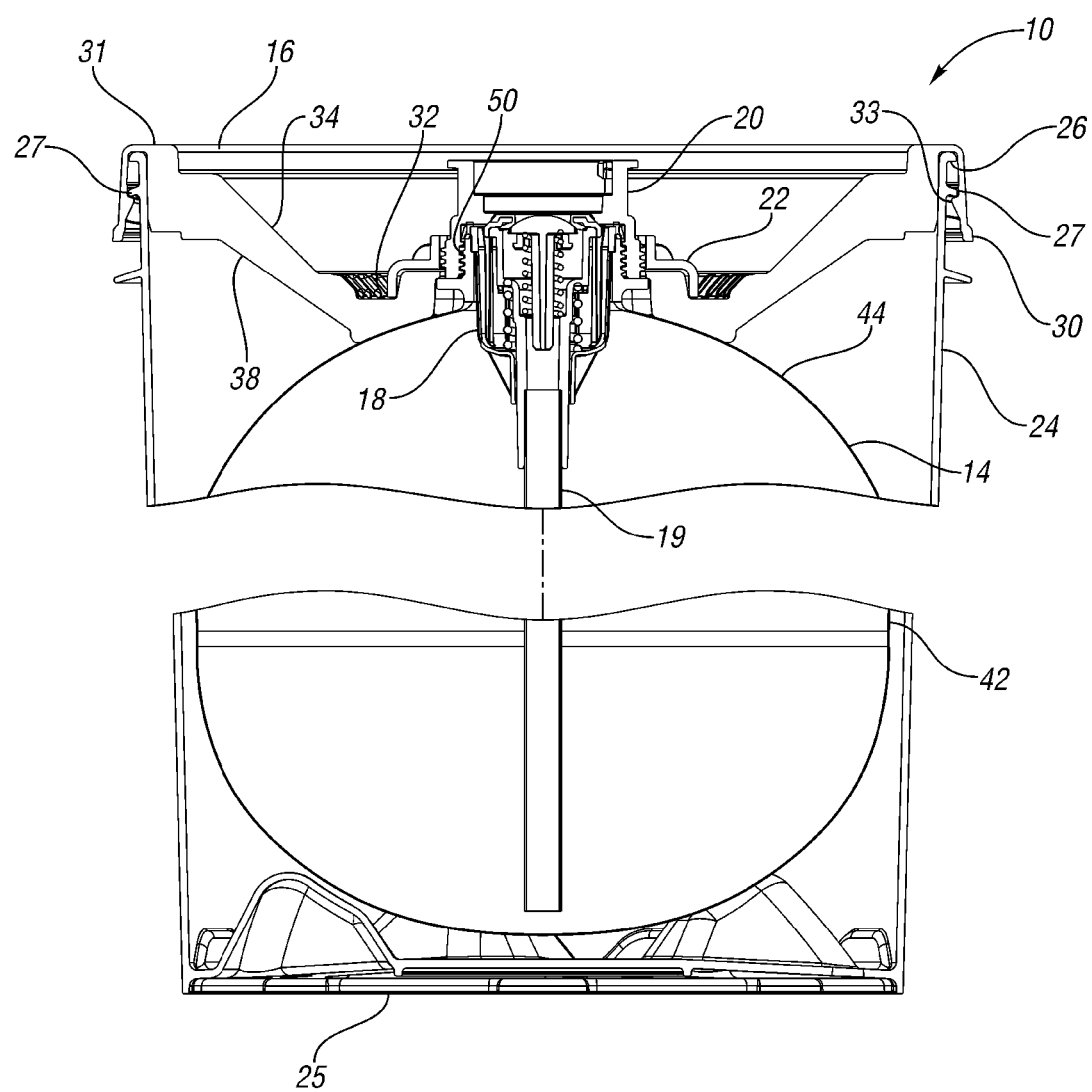
FIG. 1 is a section view of a plastic keg according to a first embodiment of the present invention.

FIG. 1 is a section view of an assembled plastic beer keg 10 according to one embodiment of the present invention. The plastic beer keg 10 generally includes an outer container 12 surrounding an inner liner 14, such as a PET bottle. A lid 16 is secured over an open end of the outer container 12 to retain the liner 14 within the interior of the outer container 12. A valve assembly 18 is retained in the mouth of the liner 14 by a retainer 20, which protrudes through the lid 16. A tube 19 extends from the valve assembly 18 to the bottom of the liner 14.

The outer container 12 includes a cylindrical outer wall 24 extending upward from the periphery of a base 25. The outer wall 24 has an outwardly projecting lip 26 at an upper edge thereof. A plurality of locking ribs 27 (in this example, four) project outward from the cylindrical outer wall 24 below the lip 26.

The lid 16 includes a lip 30 extending downward from a generally horizontal, annular rim portion 31 extending about the periphery of the lid 16 and sealed over the lip 26 of the outer container 12. A plurality of inwardly-projecting shoulders 33 are formed about the inner periphery of the lip 30 of the lid 16 and are secured below the locking ribs 27 of the cylindrical outer wall 24.

The lid 16 further includes a lower annular wall 32 spaced below the upper edge of the outer container 12 and connected by a frustoconical wall 34 to the outer periphery of the lid 16. A plurality of radially extending ribs 38 reinforce the frustoconical wall 34. The retainer 20 projects through an opening defined through the center of the lid 16.

The liner 14 is a PET bottle or other suitable material having generally cylindrical side walls 42 and an upper shoulder portion 44 transitioning to a neck 50, which as shown, may be threaded.

The retainer 20 is secured to the neck 50 of the liner 14 in order to retain the valve assembly 18 within the neck 50. The retainer 20 is secured to the neck 50 of the liner 14 by a snap-fit or by threading that may lock in place when the threads bottom out. A fastener, in this case a locking ring 22, is secured to the retainer 20 to secure the retainer 20 to the lid 16. In this example, the locking ring 22 is threaded to the retainer 20 to prevent the retainer 20 from being removed downwardly through the opening in the lid 16.

FIGS. 2 and 3 are exterior views of the keg 10 of FIG. 1. As shown, the wall 24 of the outer container 12 may include handle openings 40 (one shown, but one would be on the opposite side). A skirt 28 (FIG. 2) may extend around the periphery of the wall 24 to provide ease of handling. The outer container 12, the lid 16, and the retainer 20 may each be separately molded of HDPE, polypropylene or other suitable materials.

FIGS. 4 and 5 are side views of the keg 10.

Figure 8:
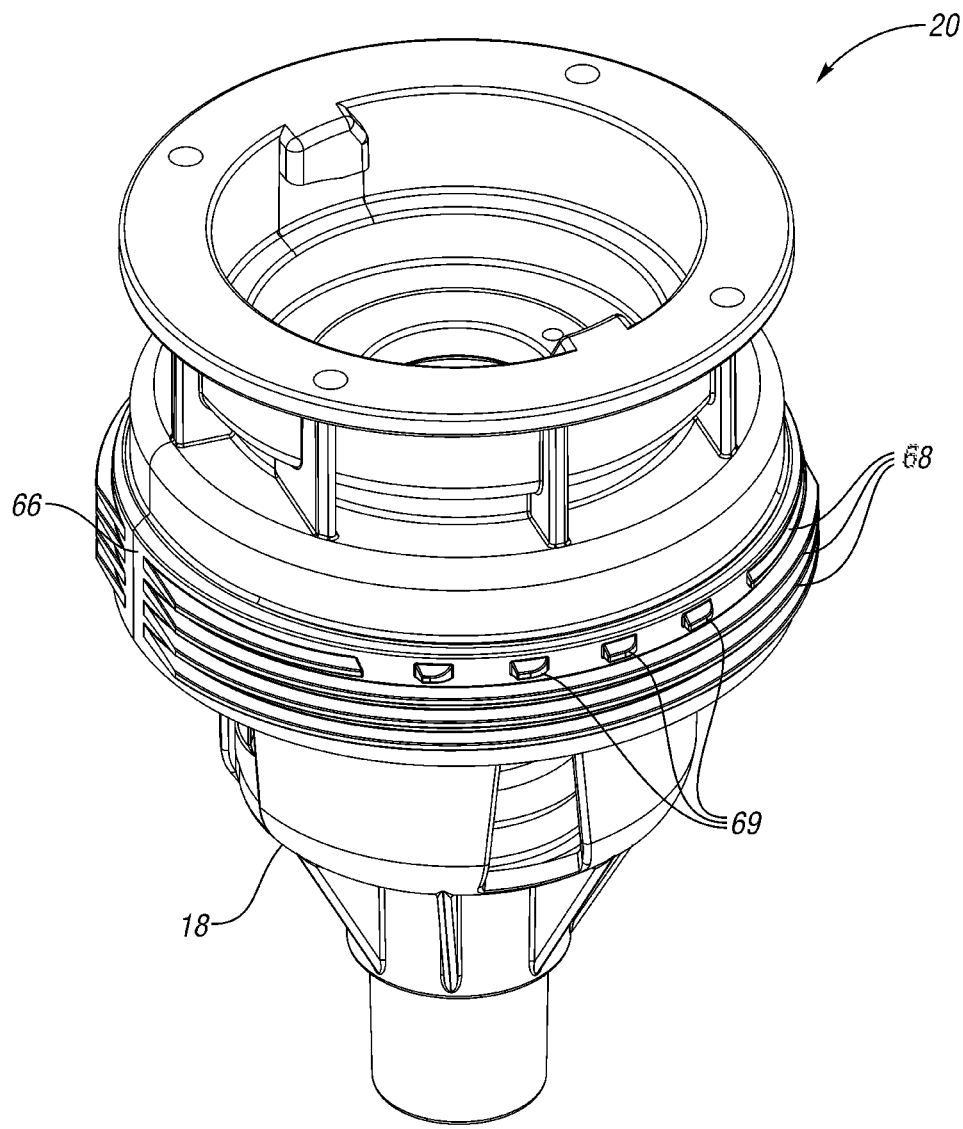
FIG. 8 is a perspective view of the retainer.

FIGS. 7 and 8 are side views of the outer container 12. As shown, there are four locking ribs 27 disposed about the periphery of the outer container 12. As shown, the locking rib 27 angles downwardly between a leading rib 52 and a stop rib 57 that extends downward past the locking rib 27. The lid 16 can be attached to the outer container 12 in either of two ways. First, with the shoulders 33 aligned with the locking ribs 27, the lid 16 is then pressed down until the locking ribs 27 bias the shoulders 33 outward until the shoulders 33 snap down below the locking ribs 27, thereby locking the lid 16 to the container 12. Alternatively, the lid 16 can be placed on the container 12 with the shoulders 33 to the counter-clockwise position of the locking ribs 27.

Referring to FIG. 8, the retainer 20 includes an annular wall 66 having external threads 68. At least a portion of at least one of the external threads 68 is separated into a plurality of tapered ratchet teeth 69.

Figure 9:
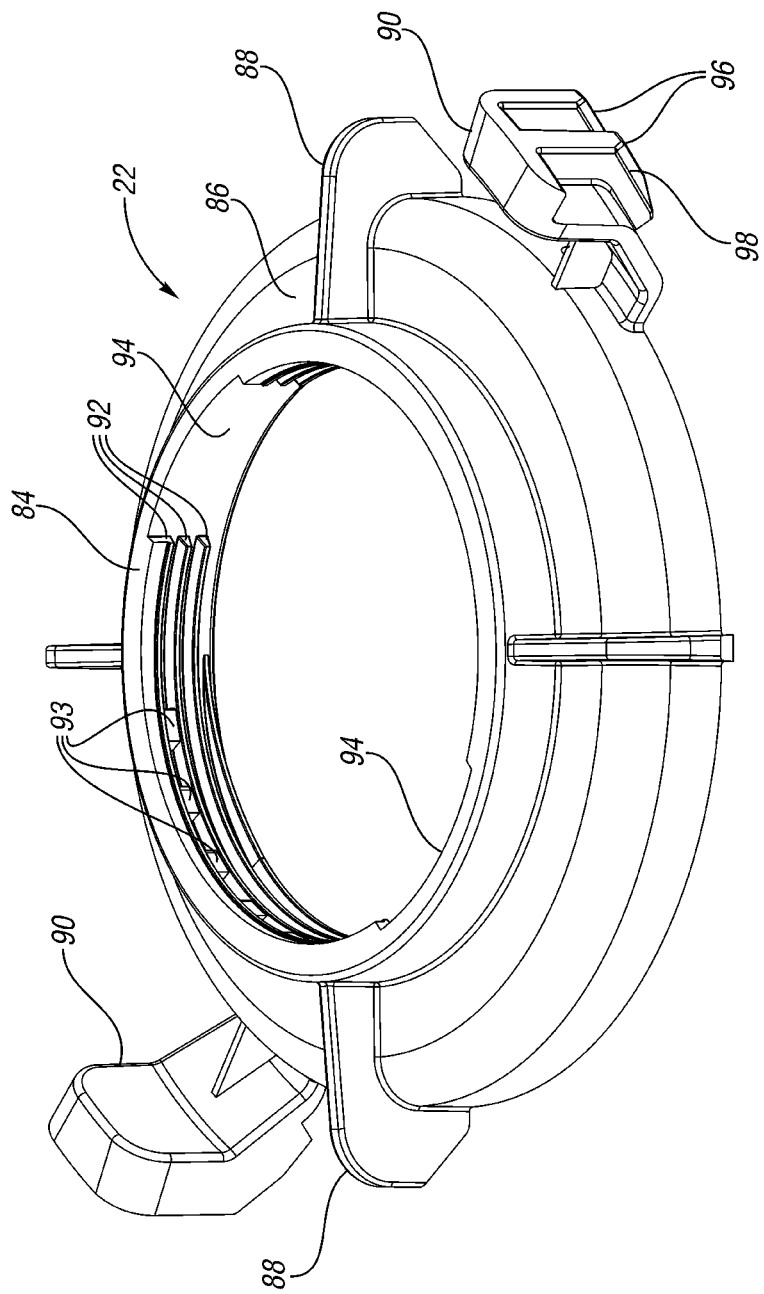
FIG. 9 is a perspective view of the locking ring.

FIG. 9 is a perspective view of the locking ring 22. The locking ring 22 includes a generally vertical annular wall 84 having interior threads 92 having vertically aligned gaps 94. Teeth 93 are formed between at least one pair of the interior threads 92.

An outer annular portion 86 curves outward and downward from a lower edge of the annular wall 84. Radially extending ribs 88 facilitate rotating the locking ring 22 by hand or with automated equipment. Locking ring tabs 90 protrude radially outwardly from the outer annular portion 86. The locking ring tabs 90 are configured so that they can be bent back or broken for disassembly after use.

Figure 10:
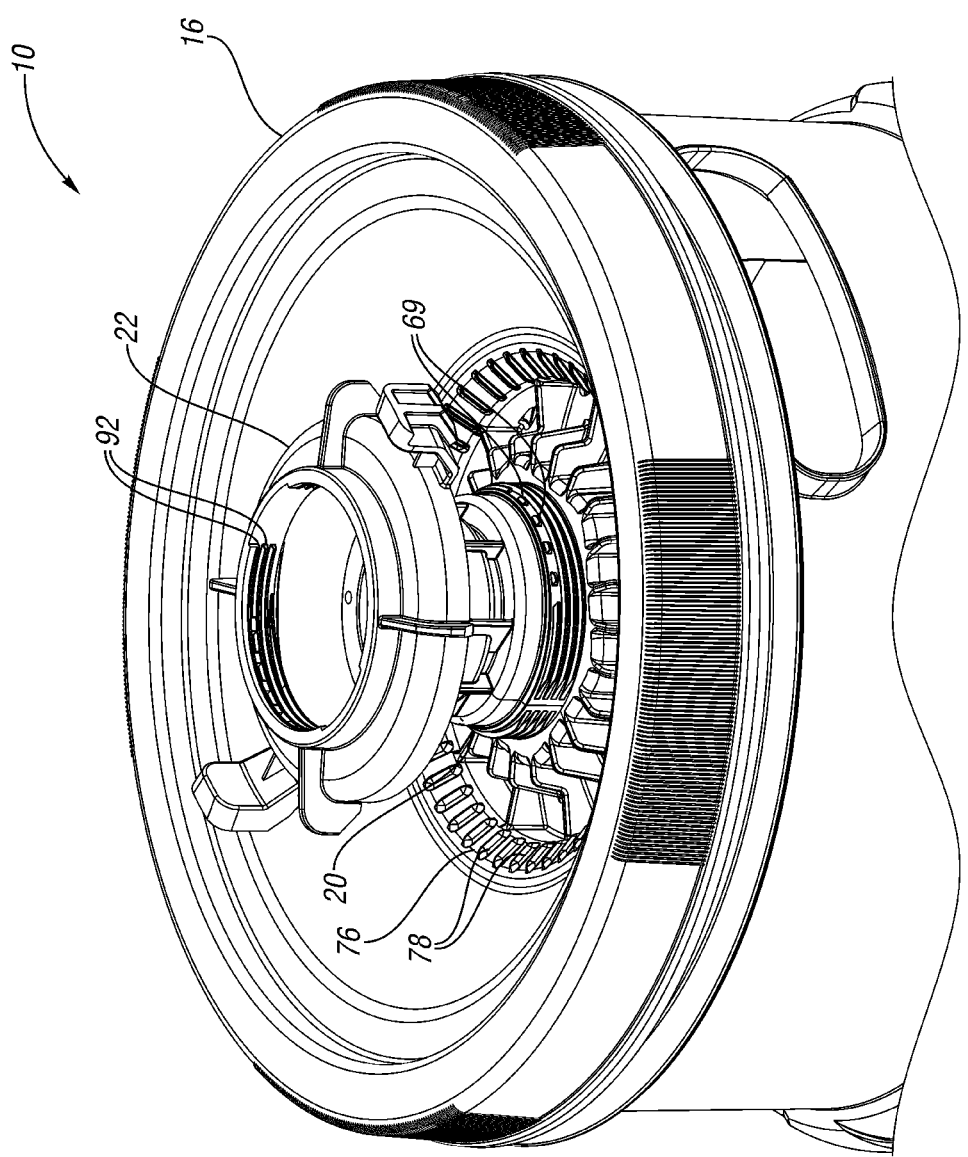
FIG. 10 is a perspective view of the top of the plastic keg showing the locking ring being attached to the retainer.

Ratcheting teeth 96 are formed on the outer ends of the locking ring tabs 90. The ratcheting teeth 96 each include a tapered surface 98 to provide the ratcheting function against the ratchet teeth 78 on the inner frustoconical wall 76 of the lid 16, as can be seen in FIG. 10. The ratcheting teeth 96 would permit the locking ring 22 to be rotated in a tightening direction (in this case, clockwise) and prevent rotation in a loosening direction (in this case, counterclockwise). After use, the locking ring tabs 90 can be bent back or broken for disassembly and recycling of the keg 10.

The teeth 93 (FIG. 9) in the interior threads 92 of the locking ring 22 engage the tapered ratchet teeth 69 of the retainer 20 when the locking ring 22 is threaded onto the retainer 20, as shown in FIG. 10. The teeth 93 and teeth 69 provide a ratchet mechanism between the locking ring 22 and the retainer 20. The tapered ratchet teeth 69 permit the teeth 93 on the locking ring 22 to rotate past to attach the locking ring 22 to the retainer 20, but do not permit the locking ring 22 to be subsequently removed from the retainer 20. However, when a user seeks to remove the locking ring 22 by rotation, this will cause the retainer 20 to rotate, thereby unscrewing the retainer 20 from the neck 50 of the liner 14. Before the retainer 20 is completely removed, the pressure in the liner 14 is released through vertically aligned gaps in the interior threads in the retainer 20 and vertically aligned gaps in the exterior threads on the neck 50 of the liner 14.

FIG. 11 is a top view of the locking ring 22. FIG. 12 is a section view taken along line C-C of FIG. 11. FIG. 13 is a section view taken along line D-D of FIG. 11. FIG. 14 is a section view taken along line F-F of FIG. 11.

Figure 15:
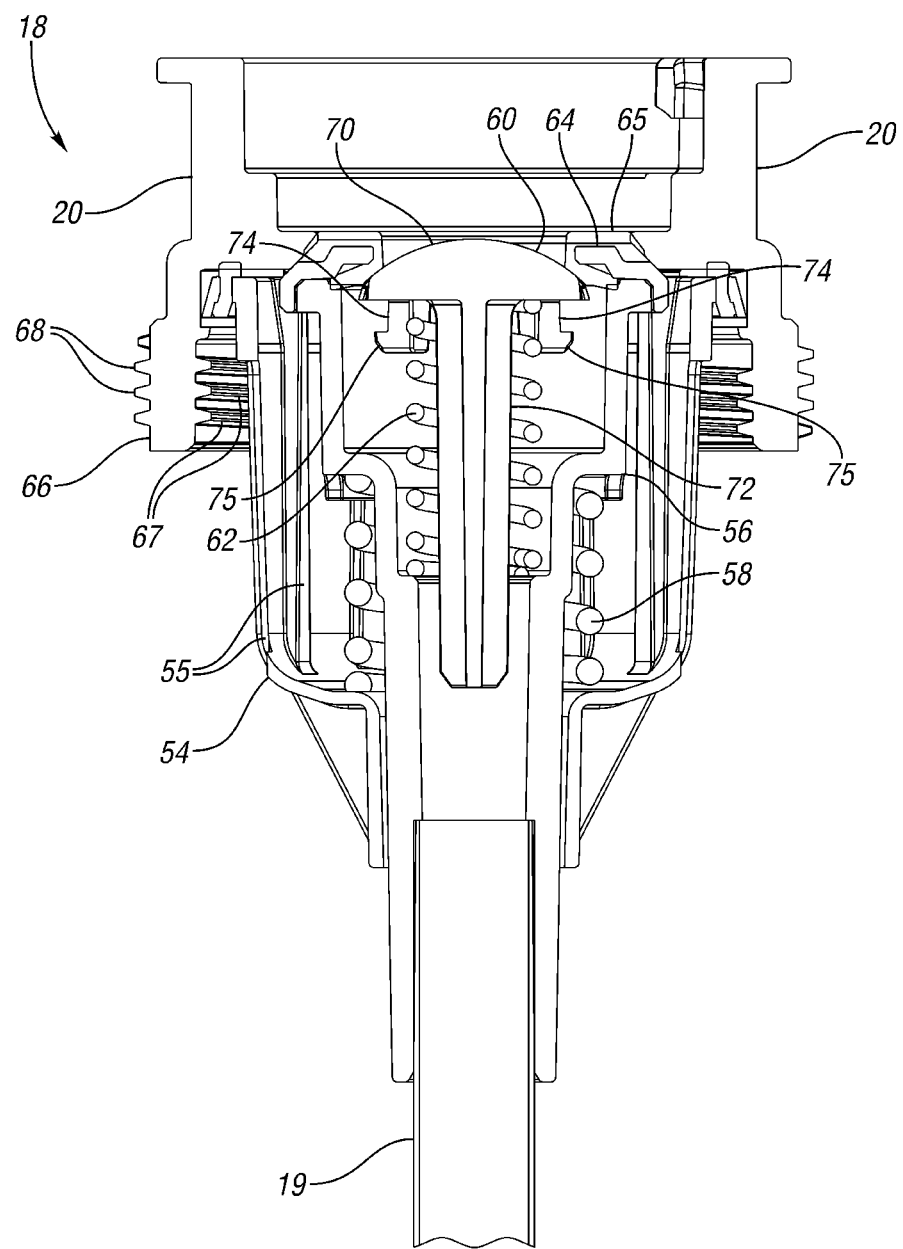
FIG. 15 is a section view through the retainer and valve assembly in a normal condition.
Figure 16:
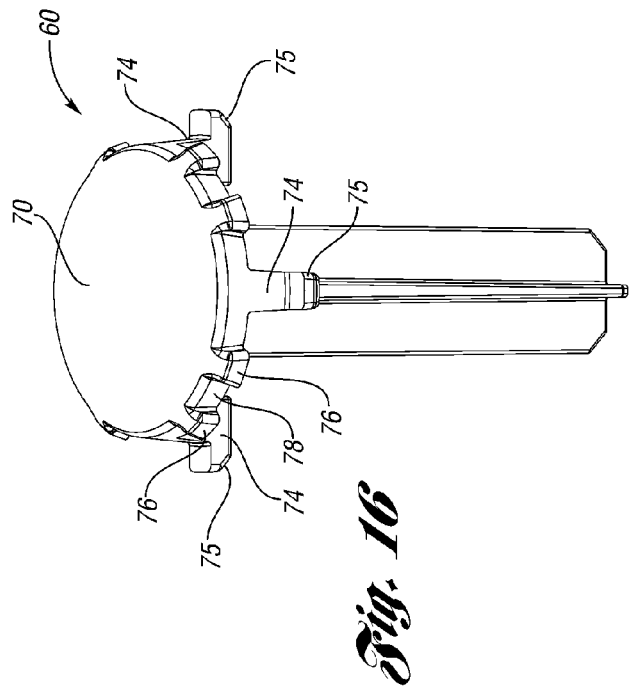
FIG. 16 is a perspective view of the port.
Figure 19:
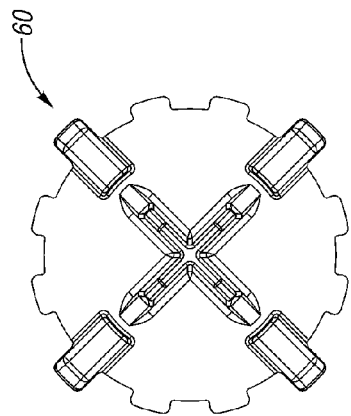
FIG. 19 is a bottom view of the port.
Figure 17:
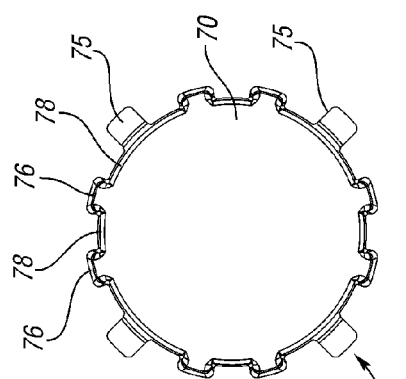
FIG. 17 is a top view of the port.
Figure 18:
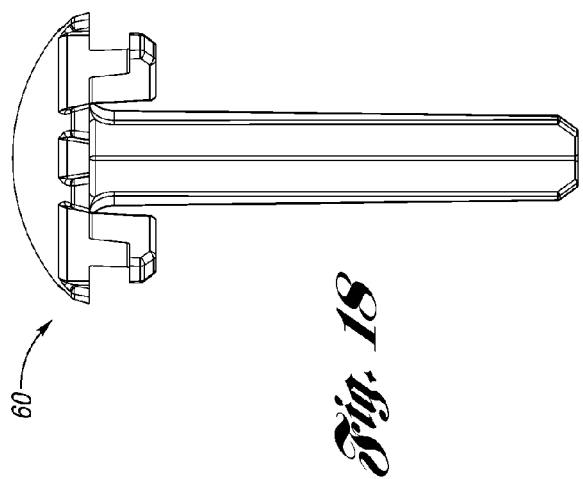
FIG. 18 is a side view of the port.

A section view of the valve assembly 18 is shown in FIG. 15. A cup 54 has a plurality of openings 55. A valve body 56 received in the cup 54 is connected to the tube 19 and biased away from the cup 54 by an outer spring 58. A port 60 is received in the valve body 56 and biased away from the valve body 56 by an inner spring 62 toward a piston 64 having a seal 65. The piston 64 is biased toward the retainer 20. The retainer 20 includes an annular wall 66 having external threads 68. The annular wall 66 of the retainer 20 also includes internal threads 67 that may have vertically aligned gaps which, together with gaps in the threads on the neck of the liner 14, permit the controlled release of pressure in the liner 14 when the retainer 20 is unscrewed.

The port 60 includes a convex head portion 70 and an elongated tail portion 72 extending downwardly from a lower surface thereof. A plurality (in this example, four) of legs 74 extend downwardly from the lower surface of the head portion 70, spaced outward from the tail portion 72. Stops 75 project radially outwardly from lower ends of the legs 74. Referring to FIGS. 16-19, the stops 75 of the port 60 project radially outward further than the head portion 70. The head portion 70 includes alternating radial projections 76 and recesses 78 about its periphery.

Figure 20:
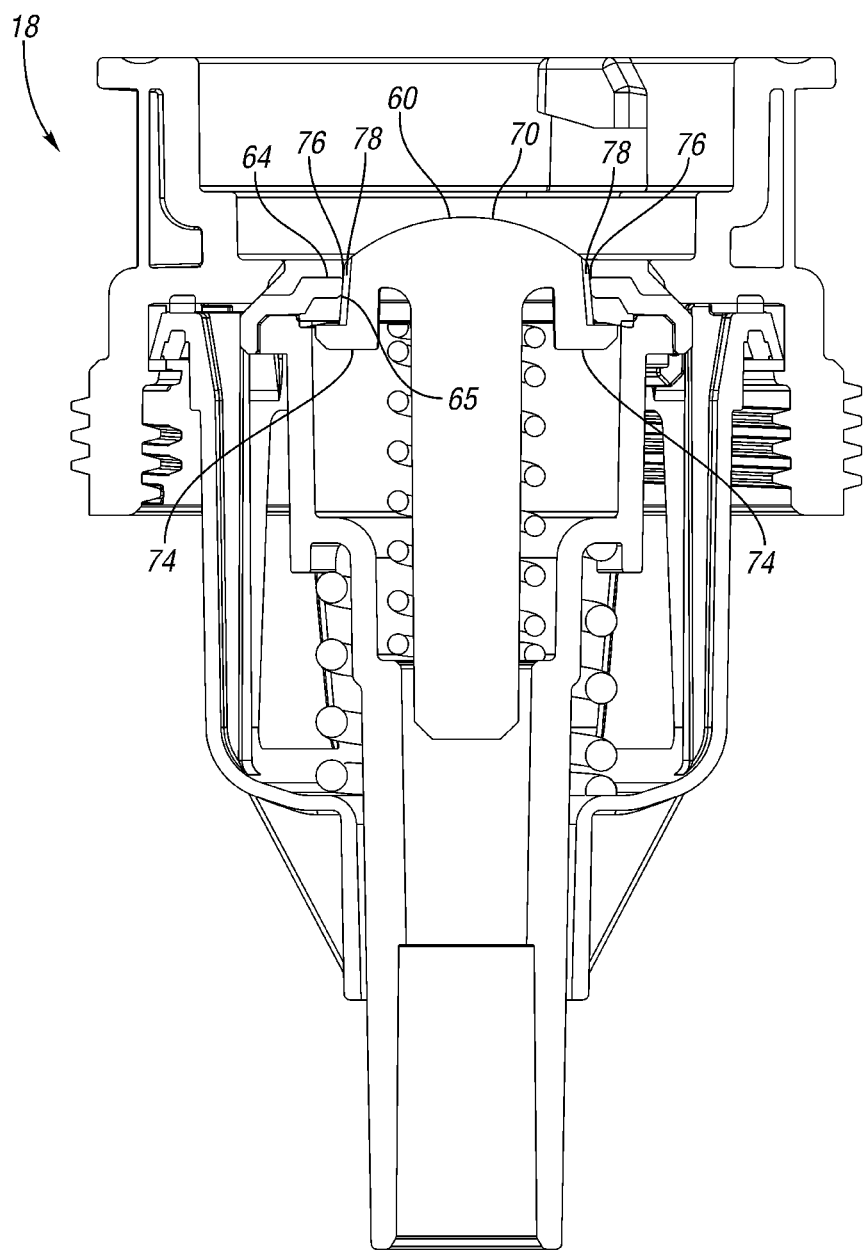
FIG. 20 is a section view of the retainer and valve assembly, similar to FIG. 15, in an overpressure condition.
Figure 21:
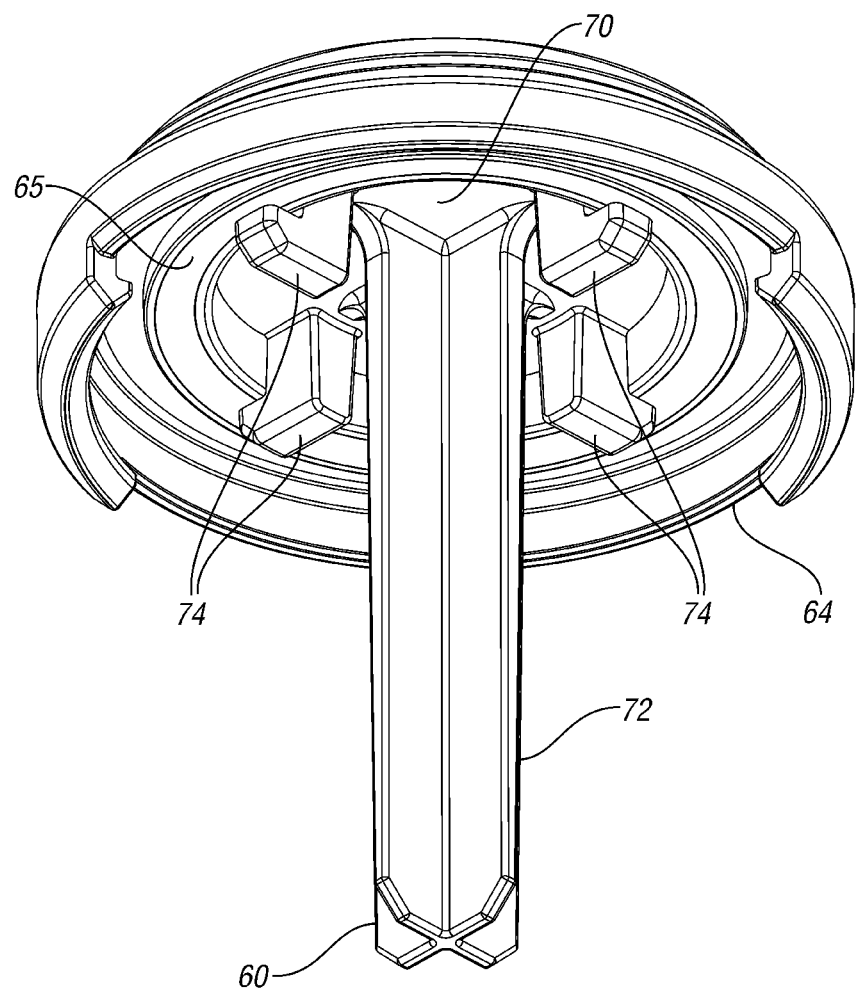
FIG. 21 is a bottom perspective view of the port and piston of FIG. 20 in the overpressure condition.

In normal operation, the head portion 70 of the port 60 is biased against the seal 65 of the piston 64 thereby closing the opening defined by the port 60 as shown in FIG. 15 (and selectively biased downward away from the piston 64 to access the keg 10 during use). In a significant overpressure situation, the head portion 70 of the port 60 may be forced into the opening of the piston 64, as shown in FIG. 20. In that case, the stops 75 will limit the movement of the port 60 and retain the port 60 in the valve assembly 18 as shown in FIG. 21. The alternating projections 76 on the head portion 70 will force the opening of the piston 64 outward, thereby permitting release of pressure in the liner 14 through the recesses 78 between the projections 76. This permits the pressure in the liner 14 to be released, while preventing the port 60 from separating from the valve assembly 18.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A plastic beer keg including:
   a lid having an opening;
   a liner including a neck portion and a body portion;
   a retainer formed separately of the liner and the lid and secured to the neck portion of the liner and aligned with the opening in the lid, the retainer including external threads; and
   a locking ring having internal threads secured to the external threads of the retainer, the internal threads of the locking ring and the external threads of the retainer including a ratchet mechanism permitting attachment of the locking ring to the retainer and inhibiting removal of the locking ring from the retainer, the locking ring contacting the lid.

2. The plastic beer keg of claim 1 further including a valve assembly within the neck portion of the liner and the retainer.

3. The plastic beer keg of claim 1 wherein the lid abuts a shoulder portion of the liner radially outward of the neck portion.

4. The plastic beer keg of claim 1 wherein the ratchet mechanism includes first teeth between first threads.

5. The plastic beer keg of claim 4 wherein the ratchet mechanism includes a portion of a second thread separated to form second teeth that engage the first teeth between the first threads.

6. The plastic beer keg of claim 5 wherein at least one of the first teeth and the second teeth are tapered to form ratcheting teeth.

7. The plastic beer keg of claim 1 further including a container having a base and a wall extending upward from a periphery of the base to define a container interior, the liner disposed at least partially within the container interior, the lid connected to the wall of the container over at least a portion of the liner.

8. The plastic beer keg of claim 1 wherein the retainer includes internal threads and the neck portion includes external threads and wherein at least one of the internal threads on the retainer and the external threads on the neck portion includes gaps for controllably releasing pressure in the liner.

9. The plastic beer keg of claim 6 wherein the retainer includes internal threads and the neck portion includes external threads and wherein at least one of the internal threads on the retainer and the external threads on the neck portion includes gaps for controllably releasing pressure in the liner.

10. The plastic beer keg of claim 1 wherein the neck portion and the body portion of the liner are formed of the same material.

11. The plastic beer keg of claim 10 wherein the liner is a PET bottle.

12. The plastic beer keg of claim 11 wherein the ratchet mechanism includes first teeth between first threads.

13. A plastic beer keg including:
a container having an outer wall to at least partially define a container interior;
a lid secured to the outer wall of the container, the lid having an opening;
a liner including a neck portion and a body portion, the body portion of the liner in the container interior, the neck portion at least partially disposed outward of the opening through the lid;
a valve at least partially disposed within the neck portion of the liner;
a locking ring non-removably connected to the liner to secure the lid to the liner, the locking ring having internal threads; and
a retainer connected to the neck portion of the liner, the locking ring non-removably secured directly to the retainer, wherein the internal threads of the locking ring are secured to external threads of the retainer, the internal threads of the locking ring and the external threads of the retainer including a ratcheting mechanism permitting attachment of the locking ring to the retainer and inhibiting removal of the locking ring from the retainer, wherein the retainer and the neck portion each include threads and wherein the threads on at least one of the retainer and the neck portion includes gaps for controllably releasing pressure in the liner.

14. A plastic beer keg including:
a container having an outer wall to at least partially define a container interior;
a lid secured to the outer wall of the container, the lid having an opening;
a liner including a neck portion and a body portion, the body portion in the container and an uppermost surface of the neck portion above the lid proximate the opening of the lid;
a retainer threadably secured to the neck portion of the liner and aligned with the opening in the lid, wherein threads on at least one of the retainer and the neck portion includes gaps for controllably releasing pressure in the liner; and
a locking ring non-removably securable to the retainer, the locking ring contacting the lid, wherein rotation of the locking ring imparts relative rotation between the retainer and neck portion and releases pressure in the liner via the gaps.

* * * * *